United States Patent [19]

Dacquay

[11] Patent Number: 5,272,709
[45] Date of Patent: Dec. 21, 1993

[54] FREQUENCY DOUBLED LASER HAVING POWER TRIGGERED OPTIMIZATION AND REGULATION

[75] Inventor: Bruno Dacquay, Aubiere, France

[73] Assignee: Alcon Surgical, Inc., Fort Worth, Tex.

[21] Appl. No.: 955,613

[22] Filed: Oct. 2, 1992

[51] Int. Cl.⁵ .................. H01S 3/106; H01S 3/109; H01S 3/10
[52] U.S. Cl. .................................... 372/22; 372/21; 372/20; 359/328
[58] Field of Search ................ 372/21, 22, 20; 359/328

[56] References Cited

U.S. PATENT DOCUMENTS

| | | |
|---|---|---|
| 3,262,058 | 7/1966 | Ballman et al. |
| 3,747,022 | 7/1973 | Nanamatsu et al. |
| 3,858,056 | 12/1974 | Melamed et al. ............ 359/328 |
| 3,949,323 | 4/1976 | Bierlein et al. |
| 3,975,693 | 8/1976 | Barry et al. ............ 372/18 |
| 4,826,283 | 5/1989 | Chuangtian et al. |
| 4,907,235 | 3/1990 | Kuizenga |
| 4,913,533 | 4/1990 | Kafka et al. ............ 359/328 |
| 5,047,668 | 9/1991 | Bosenberg |
| 5,117,126 | 5/1992 | Geiger |
| 5,144,630 | 9/1992 | Lin |
| 5,179,562 | 1/1993 | Marason et al. ............ 372/21 |

OTHER PUBLICATIONS

G. C. Bjorklund *Servo Tuning and Stabilization of Nonlinear Optical Crystals* IEEE J. of Quantum Electronics, vol. QE-15, No. 4, pp. 228-229, Apr. 1979.

Chapter 2, pp. 477-526 of the book *Solid-State Laser Engineering*, Walter Koechner, Springer-Verlag Berlin Heidelberg 1988.

Primary Examiner—Georgia Y. Epps
Assistant Examiner—Robert McNutt
Attorney, Agent, or Firm—Jeffrey S. Schira

[57] ABSTRACT

A nonlinear optical device having a yttrium-aluminum-garnet or yttrium-lithium-fluoride laser rod for producing radiation of a fundamental wavelength, a first mirror located in front of the laser rod along the longitudinal axis of the laser rod reflective of the radiation of the fundamental wavelength but transmissive of radiation of a desired harmonic wavelength, a second mirror located to the rear of the laser rod along the longitudinal axis of the laser rod reflective of radiation of the fundamental wavelength, a phase matched crystal harmonic wavelength generator mounted on a movable platform driven by a motor arranged between the front mirror and the laser rod responsive to radiation of the fundamental wavelength for generating radiation of the desired harmonic wavelength, an output sensor arranged in front of the first mirror for generating a signal indicative of the output power of the laser rod, a beamsplitter for directing a portion of the laser rod output power to the output sensor and a computer for receiving the signal generated by the output sensor and controlling the platform to tune the phase matched crystal in response to the signal.

16 Claims, 1 Drawing Sheet

FREQUENCY DOUBLED LASER HAVING POWER TRIGGERED OPTIMIZATION AND REGULATION

BACKGROUND OF THE INVENTION

Electrooptic devices using the non-zero components of the second order polarizability tensor to achieve second harmonic generation, parametric amplification, the addition and subtraction of frequencies, tunable frequencies, modulation and the like of coherent electromagnetic radiation have been described by Albert A. Ballman, Gary D. Boyd and Robert C. Miller in U.S. Pat. No. 3,262,058, by J.A. Giordmaine and Robert C. Miller in U.S. Pat. No. 3,328,723, by Satoshi Nanamatsu and Masakazu Kimura in U.S. Pat. No. 3,747,022 by John Bierlein and Thurman Gier in U.S. Pat. No. 3,949,323 and by Chen Chuangtian, Wu Yicheng, Wu Bochang and You Guming in U.S. Pat. No. 4,826,283 which are incorporated herein in their entirety.

Electromagnetic waves propagating in a crystal having nonlinear optical properties induce polarization waves with frequencies that are the sum and the difference of the frequencies of the exciting waves. These polarization waves can radiate electromagnetic waves having the frequencies of the polarization waves. The energy transferred to a radiated electromagnetic wave from a polarization wave depends on the magnitude of the component of the second order polarizability tensor involved because this tensor element determines the amplitude of the polarization wave and also the distance over which the polarization wave and the radiated electromagnetic wave can remain sufficiently in phase, called the coherence length. The coherence length is give by $$\frac{\pi}{\Delta K}$$

wherein $\Delta K$ is the difference between the wave vector of the radiated electromagnetic wave and the wave vector of the polarization wave. Phase matching occurs when the waves are completely in phase, that is when $\Delta K=0$. The condition $\Delta K=0$ can also be expressed as $n_3 w_3 = n_1 w_1 \pm n_2 w_2$ wherein $w_3 = w_1 \pm w_2$ and where $w_1$ and $w_2$ are the frequencies of the incident light and $w_3$ is that of the radiated optical wave and the n's are the corresponding refractive indices. The plus signs are appropriate when the sum frequency is the one of interest; the minus signs are appropriate when the difference frequency is the one of interest. A particular case which will be used as a simple example of nonlinear effects in second harmonic generation (SHG) where there is only one incident wave of frequency w and $w_1 = w_2 = w$ and $w_3 = 2w$.

The above phase matching conditions can be met with birefringent crystals provided the refractive index difference between the ordinary and the extraordinary rays is sufficiently large to offset the change of refractive index with frequency, i.e., optical dispersion.

A complication in this phase matching process is the fact that phase matching occurs only for certain crystallographic directions. If a light ray deviates from this phase-matched direction, a mismatch occurs and $\Delta K$ is no longer zero. For example, when collinear phase-matched SHG is used such a situation occurs if the alignment of the incoming beam and the phase-matched crystallographic direction is not exact or if the incoming beam is slightly divergent. In general, $\Delta K$ will be a linear function of the deviation $\Delta e$ from the phase-matched direction. This places a restriction on the allowable angular divergence since a useful coherence length must be maintained. In addition, because of the double refraction, the radiated electromagnetic wave and the polarization wave will in general propagate in different directions, termed "walk-off", thereby reducing the interaction distance. Phase matching under these unfavorable conditions is called "critical phase matching" (CPM). For certain crystallographic directions, $\Delta K$ does not vary linearly with the angular deviation $\Delta e$, but rather varies as $(\Delta e)^2$. As a result, greater divergence from the phase is allowable and no first-order "walk-off" occurs. Phase matching under these conditions is called "non-critical phase matching" (NCPM). The advantages of NCPM over CPM for practical devices are obvious. The indices of refraction can be adjusted by temperature variation or compositional variation in suitable cases so that phase matching occurs for crystallographic directions along which NCPM is possible. For biaxial crystals such as lithium triborate (LiB$_3$O$_5$ or "LBO" crystals), NCPM conditions are possible for the SHG only when propagation is along certain of the principal axes of the optical indicatrix. (M.V. Hobden, J. Appl. Phys. 38, 4365 [1967])

The possibility of achieving one or more types of phase matching, and the appropriate orientation of the crystal to the incident wave depends on the existence of non-zero elements in the second order polarizability tensor. Depending on the point group symmetry of the crystal, some elements will be identically zero and equalities are imposed on other elements. The magnitude of the effects will depend on the magnitude of the non-zero elements.

Generally phase matching is one of two types:

Type I wherein the two incident waves have the same polarizations and

Type II wherein the two incident waves have orthogonal polarization.

Phase matching can be achieved by "tuning" the crystal in various ways.

(1) By rotation of the crystal to vary the refractive indices.

(2) By varying the temperature.

(3) By application of an electric field.

(4) By compositional variation.

The preferred methods of tuning the crystal has been either to vary the temperature of the crystal or to rotate the crystal to vary the refractive indices. However, with extremely fragile crystals, such as LBO crystals, the temperature tuning method is not particularly suitable and may result in premature crystal failure. In addition, temperature tuning is slow, thereby limiting the stabilization bandwidth of the crystal. Accordingly, the preferred method of tuning LBO crystals is the crystal rotation method.

Prior to the present invention, nonlinear optical devices (NLO) have had fixed crystals set at the (presumably) optimal phase matching position. This arrangement precludes fine tuning of the crystal rotation to account for changes due to vibration, heat and other variables. As a result, most NLO's operate in a slightly out of phase condition, reducing the power output of the device.

In addition, prior to the present invention, the power output of the NLO was regulated by varying the intensity of the fundamental wavelength ($\lambda_1$) emitted by the lasing medium by reducing the pumping of the power rod or, a polarization system can be used at the cavity output. Reducing the power rod pumping, however, modifies the thermal lens and creates instability. A polarization system only reduces the output power by a fixed amount and does not provide a means to adjust or optimize the power output.

Accordingly, a need has continued to exist for a method of optimizing and regulating the power output of a frequency doubled laser.

BRIEF DESCRIPTION OF THE INVENTION

The present invention improves upon prior art methods of tuning and regulating nonlinear optical devices by providing a nonlinear optical device that continuously optimizes and regulates its output power by rotating the frequency doubling crystal in response to a power output sensor. The sensor measures the output power of the NLO and transmits this information to a microprocessor that controls a movable platform on which the crystal is mounted. By continuously angle tuning the crystal, changes in output power due to vibration, heat and other variables affecting the phase angle of the crystal can be compensated for, permitting full power output under a wide variety of conditions. In addition, by moving the crystal to a slightly out of phase condition, the output power of the NLO can be varied without reducing the pumping of the power rod or placing a polarization system at the laser cavity output.

Accordingly, one objective of the present invention is to provide a nonlinear optical device wherein the frequency doubling crystal is continuously tuned.

Another objective of the present invention is to provide a nonlinear optical device having a continuously regulated output power.

Still another objective of the present invention is to provide a nonlinear optical device using a nonthermal method of tuning the frequency doubling crystal.

These and other objectives and advantages of the method of the present invention will become obvious from the detailed description, drawings and claims that follow.

DETAILED DESCRIPTION OF THE INVENTION

Figure 1:
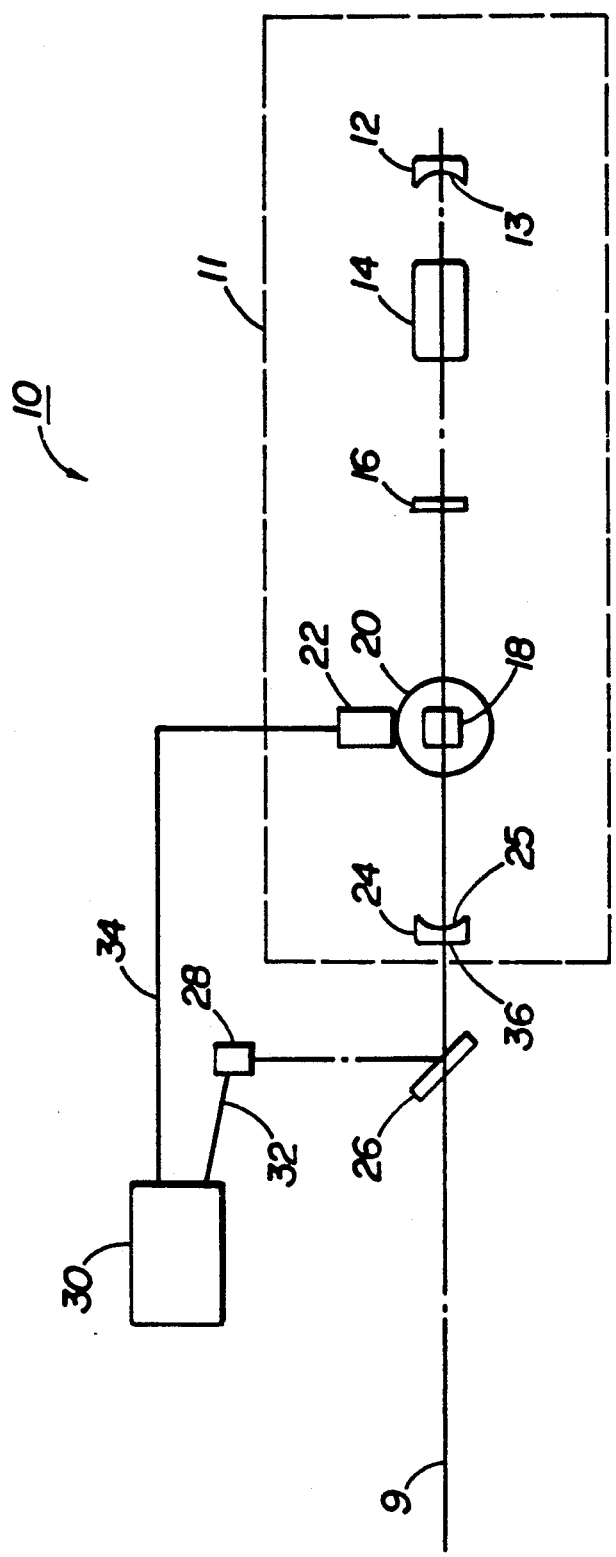
FIG. 1 is a schematic illustration of a nonlinear optic device of the present invention.

As can be seen in FIG. 1, nonlinear optic device 10 of the present invention generally contains linear laser cavity 11 having rear mirror 12, lasing medium 14, harmonic wavelength isolator 16, frequency doubling crystal 18, platform 20, motor 22 and front mirror 24, beamsplitter 26, sensor 28 and microprocessor 30.

Linear laser cavity 11 is preferably adapted for the internal generation of a fundamental wavelength and the overall output of a harmonic wavelength of radiation incorporating the method of the present invention. Other laser cavities 11 having additional or fewer elements and generating the harmonic wavelength internal to or external of cavity 11 may also be used. Laser cavity 11 includes lasing medium 14 which is pumped by an energy source (not shown) to generate an intracavity fundamental wavelength of $\lambda_1$. In the medical field, lasing medium 14 is preferably either a yttrium-aluminum-garnet (YAG) rod producing fundamental wavelengths of about 1.064 or 1.32 nanometers (nm), or a yttrium-lithium-fluoride (YLF) type rod producing characteristic fundamental frequencies of 1.054 or 1.32 nm. Situated at opposing ends of laser cavity 11, aligned with axis 9 of lasing medium 14, are intracavity reflecting front mirror 24 and intracavity reflecting rear mirror 12. Mirrors 12 and 24 are of conventional design and commercially available from sources such as CVI Laser. Front mirror 24 is of the type that is coated with a conventional material such as a multi-layer dielectric stack so as to be fully transmissive with respect to the output harmonic wavelength $\lambda_2$, but fully reflective with respective to the fundamental wavelength $\lambda_1$. In contrast, rear mirror 12 is fully reflective with respect to fundamental wavelength $\lambda_1$. Inner surface 25 of front mirror 24 can be coated with a dichroic reflector so that it is transmissive with respect to harmonic wavelength $\lambda_2$ and is reflective with respect to fundamental wavelength $\lambda_1$. Intracavity surface 13 of rear mirror 12 can be coated or otherwise processed so that it is reflective with respect to fundamental wavelength $\lambda_1$ only, as harmonic wavelength $\lambda_2$ does not enter this portion of laser cavity 11. While the term "harmonic" generally connotes an integer multiple of a fundamental, such term is used herein to also define subharmonics of the fundamental. For example, a phase matched crystal responsive to a 1.064 nm fundamental wavelength is considered herein as generating a harmonic wavelength of 0.532 nm.

Laser cavity 11 further includes a harmonic crystal 18 matched with respect to fundamental wavelength $\lambda_1$ to generate a desired harmonic wavelength $\lambda_2$. While crystal 18 is identified as being adapted to double the frequency of the fundamental frequency, other harmonics can be generated and used as an output of the system. Crystal 18 is cut with respect to the crystallographic axes in such a manner that it responds to fundamental wavelength $\lambda_1$. Harmonic wavelength isolator 16 is also disposed in laser cavity 11 between lasing medium 14 and crystal 18, perpendicular to the axis of lasing medium 14. Isolator 16 is preferably of the type that is totally reflective of harmonic wavelength $\lambda_2$, present on the left side of isolator 16, and maximizes transmission of fundamental wavelength $\lambda_1$, whether directed in the right hand or left hand direction, and may be a dichroic mirror. With such an arrangement of laser cavity 11, harmonic wavelength $\lambda_2$ does not enter that portion of laser cavity 11 on the right hand side of harmonic isolator 16 because crystal 18 is the mechanism for generating harmonic wavelength $\lambda_2$ and isolator 16 is highly reflective of harmonic wavelength $\lambda_2$. The location of isolator 24 between lasing medium 14 and crystal 18 can be adjusted slightly without altering fundamental wavelength $\lambda_1$. Accordingly, any component of harmonic wavelength $\lambda_2$ emitted in the right hand direction from crystal 18 is reflected by isolator 16, and thus cannot be absorbed and lost in lasing medium 14, improving the efficiency of laser cavity 11.

The output of laser cavity 11 is partially reflected (for example, 1%) by beamsplitter 26 onto sensor 28. Beamsplitter 28 is preferably a 45° plate beamsplitter. Sensor 28 detects the power output of laser cavity 11 and communicates this information with microprocessor 30 through cable 32. Sensor 28 is preferably a photovoltaic cell and microprocessor 30 is preferably at least equivalent to an INTEL ® model 80286 microprocessor. In response to the power output signal generated by sensor 28, microprocessor 30 directs the operation of motor 22 through cable 34. Motor 22 can be either a stepper motor or a continuous motor and drives platform 20 through a transmission or other means (not shown) to vary the position of platform 22 in the x, y and z planes (rotation, pitch and yaw). Crystal 18, being mounted on platform 20, moves along with platform 20, thereby changing the angle of crystal 18 relative to the output of lasing medium 14. By varying the angle of crystal 18, crystal 18 can be tuned to optimize or detuned to regulate the power output of device 10. While crystal 18 can be any suitable crystal, for example, potassium dihydrogen phosphate (KDP or $KH_2PO_4$), potassium dideuterium phosphate ($KD^*P$ or $KD_2PO_4$), potassium titanyl phosphate (KTP or $KTiOPO_4$), lithium triborate (LBO or $LiB_3O_5$), beta-barium borate (BBO), KTA, lithium niobate doped with MgO ($MgO:LiNbo_3$), lithium iodate ($LiIO_3$), RbTP, RbTA, YAB, $KNbO_3$, Urea and BANANA crystals, crystals 18 having narrow phase matching angles, such as LBO, BBO and $LiIO_3$ are preferred.

In use, when power is applied to device 10, lasing medium 14 is pumped and emits radiation with a fundamental wavelength $\lambda_1$. The frequency of this radiation is modified (for example, doubled) by crystal 18 so that radiation having a harmonic wavelength $\lambda_2$ is emitted from cavity 11 on external side 36 of mirror 24. A portion of the emitted radiation is directed by beamsplitter 26 onto sensor 28 that determines the power output of cavity 11. The sensed power output is communicated to computer 30 that compares the sensed power output with the known optimal output power of cavity 11. Computer 30 can then direct motor 22 to rotate platform 22 so as to tune crystal 18. Alternatively, computer 30 can instruct motor 22 to rotate platform 20 so as to detune crystal 18, thereby reducing the output power of cavity 11 to a desired level.

While the preferred embodiment of the invention has been disclosed with reference to specific structures and operations, it is to be understood that many changes in detail may be made as a matter of engineering choices without departing from the spirit and scope of the invention as described above.

I claim:

1. A nonlinear optical device, comprising:
   a. a lasing medium having a front face and a longitudinal axis for producing radiation of a fundamental wavelength;
   b. a first mirror located in front of the laser medium along the longitudinal axis reflective of the fundamental wavelength but transmissive of radiation of a desired harmonic wavelength;
   c. a second mirror located to a rear of the lasing medium along the longitudinal axis reflective of the fundamental wavelength;
   d. a harmonic wavelength generator arranged between the front mirror and the lasing medium along the longitudinal axis responsive to the fundamental wavelength for generating the desired harmonic wavelength; and
   e. a means for continuously tuning the harmonic wavelength generator having
      i. an output sensor arranged in front of the first mirror for generating a signal indicative of an output power of the laser medium,
      ii. a beamsplitter for directing a portion of the transmitted radiation of the harmonic wavelength to the output sensor,
      iii. a movable platform driven by a motor on which the harmonic wavelength generator is mounted permitting rotation of the harmonic wavelength generator along all three axes and
      iv. a computer for receiving the signal generated by the output sensor and controlling the platform in response to the signal.

2. The nonlinear optical device of claim 1 wherein the lasing medium comprises a yttrium-aluminum-garnet laser rod.

3. The nonlinear optical device of claim 1 wherein the lasing medium comprises a yttrium-lithium-fluoride laser rod.

4. The nonlinear optical device of claim 1, wherein the harmonic wavelength generator is effective to double the fundamental frequency of radiation generated by the lasing medium.

5. The nonlinear optical device of claim 1, wherein the harmonic wavelength generator comprises a phase matched crystal.

6. The nonlinear optical device of claim 1, wherein the harmonic wavelength generator comprises, Potassium dihydrogen phosphate, Potassium dideuterium phosphate, Potassium titanyl phosphate, Lithium triborate, Beta-barium borate, KTA, lithium niobate doped with MgO, Lithium iodate, RbTP, RbTA, YAB, $KNbO_3$, Urea or BANANA crystals.

7. A nonlinear optical device, comprising:
   a. a yttrium-aluminum-garnet laser rod having a front face and a longitudinal axis for producing radiation of a fundamental wavelength;
   b. a first mirror located in front of the laser rod along the longitudinal axis reflective of the radiation of the fundamental wavelength but transmissive of radiation of a desired harmonic wavelength;
   c. a second mirror located to a rear of the laser rod along the longitudinal axis reflective of radiation of the fundamental wavelength;
   d. a phase matched crystal harmonic wavelength generator mounted on a movable platform permitting rotation of the harmonic wavelength generator along all three axes, the platform being driven by a motor and arranged between the front mirror and the laser rod along the longitudinal axis responsive to radiation of the fundamental wavelength for generating radiation of the desired harmonic wavelength;
   e. an output sensor arranged in front of the first mirror for generating a signal indicative of a power level of the transmitted radiation of the harmonic wavelength;
   f. a beamsplitter for directing a portion of the transmitted radiation of the harmonic wavelength to the output sensor; and
   g. a computer for receiving the signal generated by the output sensor and controlling the platform to tune the phase matched crystal in response to the signal.

8. The laser system of claim 7, wherein the crystal comprises, Potassium dihydrogen phosphate, Potassium dideuterium phosphate, Potassium titanyl phosphate, Lithium triborate, Beta-barium borate, KTA, lithium niobate doped with MgO, Lithium iodate, RbTP, RbTA, YAB, $KNbO_3$ or Urea.

9. A nonlinear optical device, comprising:
   a. a yttrium-lithium-fluoride laser rod having a front face and a longitudinal axis for producing radiation of a fundamental wavelength;

b. a first mirror located in front of the laser rod along the longitudinal axis reflective of the radiation of the fundamental wavelength but transmissive of radiation of a desired harmonic wavelength;

c. a second mirror located to a rear of the laser rod along the longitudinal axis reflective of radiation of the fundamental wavelength;

d. a phase matched crystal harmonic wavelength generator mounted on a movable platform permitting rotation of the harmonic wavelength generator along all three axes, the platform being driven by a motor and arranged between the front mirror and the laser rod along the longitudinal axis responsive to radiation of the fundamental wavelength for generating radiation of the desired harmonic wavelength;

e. an output sensor arranged in front of the first mirror for generating a signal indicative of a power level of the transmitted radiation of the harmonic wavelength;

f. a beamsplitter for directing a portion of the transmitted radiation of the harmonic wavelength to the output sensor; and g. a computer for receiving the signal generated by the output sensor and controlling the platform to tune the phase matched crystal in response to the signal.

10. The laser system of claim 9, wherein the crystal comprises, Potassium dihydrogen phosphate, Potassium dideuterium phosphate, Potassium titanyl phosphate, Lithium triborate, Beta-barium borate, KTA, lithium niobate doped with MgO, Lithium iodate, RbTP, RbTA, YAB, KNbO$_3$ or Urea.

11. A nonlinear optical device, comprising:

a. a lasing medium having a front face and a longitudinal axis for producing radiation of a fundamental wavelength;

b. a first mirror located in front of the laser medium along the longitudinal axis reflective of the fundamental wavelength but transmissive of radiation of a desired harmonic wavelength;

c. a second mirror located to a rear of the lasing medium along the longitudinal axis reflective of the fundamental wavelength;

d. a harmonic wavelength generator arranged between the front mirror and the lasing medium along the longitudinal axis responsive to the fundamental wavelength for generating the desired harmonic wavelength;

e. a means for continuously tuning the harmonic wavelength generator; and f. a dichroic member harmonic wavelength isolator arranged between the laser medium and the harmonic wavelength generator along the longitudinal axis transmissive of the radiation of the fundamental wavelength but reflective of the radiation of the harmonic wavelength.

12. The nonlinear optical device of claim 11 wherein the lasing medium comprises a yttrium-aluminum-garnet laser rod.

13. The nonlinear optical device of claim 11 wherein the lasing medium comprises a yttrium-lithium-fluoride laser rod.

14. The nonlinear optical device of claim 11 wherein the harmonic wavelength generator is effective to double the fundamental frequency of radiation generated by the lasing medium.

15. The nonlinear optical device of claim 11 wherein the harmonic wavelength generator comprises a phase matched crystal.

16. The nonlinear optical device of claim 11 wherein the harmonic wavelength generator comprises, Potassium dihydrogen phosphate, Potassium dideuterium phosphate, Potassium titanyl phosphate, Lithium triborate, Betabarium borate, KTA, lithium niobate doped with MgO, Lithium iodate, RbTP, RbTA, YAB, KNbO$_3$, Urea or BANANA crystals.

* * * * *